(12) United States Patent
Sasaki et al.

(10) Patent No.: US 11,862,817 B2
(45) Date of Patent: Jan. 2, 2024

(54) ENERGY STORAGE APPARATUS

(71) Applicant: GS Yuasa International Ltd., Kyoto (JP)

(72) Inventors: Shun Sasaki, Kyoto (JP); Yasuyuki Iwashima, Kyoto (JP); Yo Hasegawa, Kyoto (JP); Tsuyoshi Hidaka, Kyoto (JP); Yuta Yamamoto, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 723 days.

(21) Appl. No.: 16/967,657

(22) PCT Filed: Feb. 4, 2019

(86) PCT No.: PCT/JP2019/003803
§ 371 (c)(1),
(2) Date: Aug. 5, 2020

(87) PCT Pub. No.: WO2019/159732
PCT Pub. Date: Aug. 22, 2019

(65) Prior Publication Data
US 2021/0242541 A1    Aug. 5, 2021

(30) Foreign Application Priority Data
Feb. 14, 2018   (JP) .................................. 2018-023943

(51) Int. Cl.
*H01M 50/507* (2021.01)
*H01M 50/51* (2021.01)
(Continued)

(52) U.S. Cl.
CPC ....... *H01M 50/507* (2021.01); *H01M 50/209* (2021.01); *H01M 50/224* (2021.01);
(Continued)

(58) Field of Classification Search
CPC ............ H01M 50/507; H01M 50/209; H01M 50/224; H01M 50/227; H01M 50/262;
(Continued)

(56) References Cited

U.S. PATENT DOCUMENTS 10,461,468 B2    10/2019  Okamoto et al.
2004/0157117 A1*  8/2004  Tamaki ................. H01M 50/50
                                                          429/100
(Continued)

FOREIGN PATENT DOCUMENTS

JP    2004-231024 A    8/2004
JP    2010-113999 A    5/2010
(Continued)

OTHER PUBLICATIONS

Machine English translation of JP 2015-041586 to Sekine (Year: 2015).*

(Continued)

*Primary Examiner* — Michael L Dignan
(74) *Attorney, Agent, or Firm* — McGinn I.P. Law Group, PLLC

(57) ABSTRACT

An energy storage apparatus includes: an energy storage device group in which a terminal surface and a side surface intersecting the terminal surface are formed by a plurality of arrayed energy storage devices; and a busbar frame holding a plurality of busbars. The busbar frame is provided with a body holding the busbar and disposed on the terminal surface, a connector holder having a connector, to which an external connector is connected, and disposed on the side surface, and a coupling portion coupling the body and the connector holder.

7 Claims, 12 Drawing Sheets

(51) Int. Cl.
  *H01R 13/518* (2006.01)
  *H01M 50/50* (2021.01)
  *H01M 50/289* (2021.01)
  *H01M 50/271* (2021.01)
  *H01M 50/262* (2021.01)
  *H01M 50/227* (2021.01)
  *H01M 50/224* (2021.01)
  *H01M 50/209* (2021.01)
  *H01M 50/569* (2021.01)

(52) U.S. Cl.
  CPC ....... *H01M 50/227* (2021.01); *H01M 50/262* (2021.01); *H01M 50/271* (2021.01); *H01M 50/289* (2021.01); *H01M 50/50* (2021.01); *H01M 50/51* (2021.01); *H01M 50/569* (2021.01); *H01R 13/518* (2013.01)

(58) Field of Classification Search
  CPC .. H01M 50/271; H01M 50/289; H01M 50/50; H01M 50/51; H01M 50/569; H01M 50/244; H01M 50/296; H01M 50/502; H01R 13/518; H01G 11/82; H01G 11/10; H01G 11/76; Y02E 60/10
  See application file for complete search history.

(56) References Cited

U.S. PATENT DOCUMENTS

| | | | |
|---|---|---|---|
| 2010/0116570 A1 | 5/2010 | Sugawara et al. | |
| 2010/0248008 A1* | 9/2010 | Sugawara | H01M 50/569 429/159 |
| 2012/0171908 A1* | 7/2012 | Henmi | H01M 10/482 439/761 |
| 2014/0134894 A1* | 5/2014 | Kinoshita | H01M 50/507 439/754 |
| 2014/0370341 A1* | 12/2014 | Oshiba | H01M 50/514 429/82 |
| 2017/0324225 A1 | 11/2017 | Nakayama et al. | |
| 2018/0219204 A1 | 8/2018 | Takase et al. | |
| 2018/0331402 A1* | 11/2018 | Inoue | H01M 10/6563 |
| 2019/0081292 A1 | 3/2019 | Shimizu et al. | |
| 2019/0334152 A1* | 10/2019 | Shimizu | H01M 50/569 |

FOREIGN PATENT DOCUMENTS

| | | | | |
|---|---|---|---|---|
| JP | 2011-171114 A | | 9/2011 | |
| JP | 2013-143281 A | | 7/2013 | |
| JP | 2014-174884 A | | 9/2014 | |
| JP | 2015-032408 A | | 2/2015 | |
| JP | 2015-041586 A | | 3/2015 | |
| JP | 2015041586 | * | 3/2015 | ............. H01M 2/10 |
| JP | 2016-100248 A | | 5/2016 | |
| JP | 2017-027831 A | | 2/2017 | |
| JP | 2018-014294 A | | 1/2018 | |
| JP | 2018-088334 A | | 6/2018 | |
| WO | WO 2017/051700 A1 | | 3/2017 | |
| WO | WO 2017/104108 A1 | | 6/2017 | |
| WO | WO 2017/158773 A1 | | 9/2017 | |

OTHER PUBLICATIONS

International Search Report (ISR) (PCT Form PCT/ISA/210), in PCT/JP2019/003803, dated Mar. 5, 2019.

* cited by examiner

ENERGY STORAGE APPARATUS

TECHNICAL FIELD

The present invention relates to an energy storage apparatus.

BACKGROUND ART

An energy storage apparatus is provided with an energy storage device group in which a plurality of energy storage devices are arrayed horizontally such that a terminal of the energy storage device is located on the upper side. The energy storage apparatus disclosed in Patent Document 1 includes a cover in which busbars connecting the terminals of adjacent energy storage devices are disposed on the terminal surface of the energy storage device group. A connector for transmitting the voltage or temperature of the energy storage device to external equipment is provided on the top of the cover.

PRIOR ART DOCUMENT

Patent Document

Patent Document 1: JP-A-2011-171114

SUMMARY OF THE INVENTION

Problems to be Solved by the Invention

In the energy storage apparatus of Patent Document 1, since the cover is disposed on the upper side of the terminal surface of the energy storage device group and the connector is formed on the top of the cover, the dimension in a direction in which the terminal protrudes (e.g., height direction) becomes large. Hence it is not possible to respond to a request from a manufacturer (e.g., automobile manufacturer) for reducing the size of the energy storage apparatus.

An object of the present invention is to provide an energy storage apparatus capable of reducing a dimension in a direction in which a terminal of an energy storage device protrudes.

Means for Solving the Problems

One aspect of the present invention provides an energy storage apparatus including: an energy storage device group in which a plurality of arrayed energy storage devices including terminals form a terminal surface where the terminals are disposed and a side surface intersecting the terminal surface; and a busbar frame holding a plurality of busbars that connects the terminals adjacent to each other. The busbar frame includes: a body holding the busbars and disposed on the terminal surface; a connector holder having a connector to which an external connector is connected, the connector holder being disposed on the side surface; and a coupling portion coupling the body and the connector holder.

Advantages of the Invention

In the energy storage apparatus according to the present invention, the body for holding the busbar is disposed on the terminal surface, and the connector holder having the connector is disposed on the side surface, thereby enabling a reduction in the dimension of the energy storage apparatus in a direction in which the terminal of the energy storage device protrudes.

MODE FOR CARRYING OUT THE INVENTION

Figure 1:
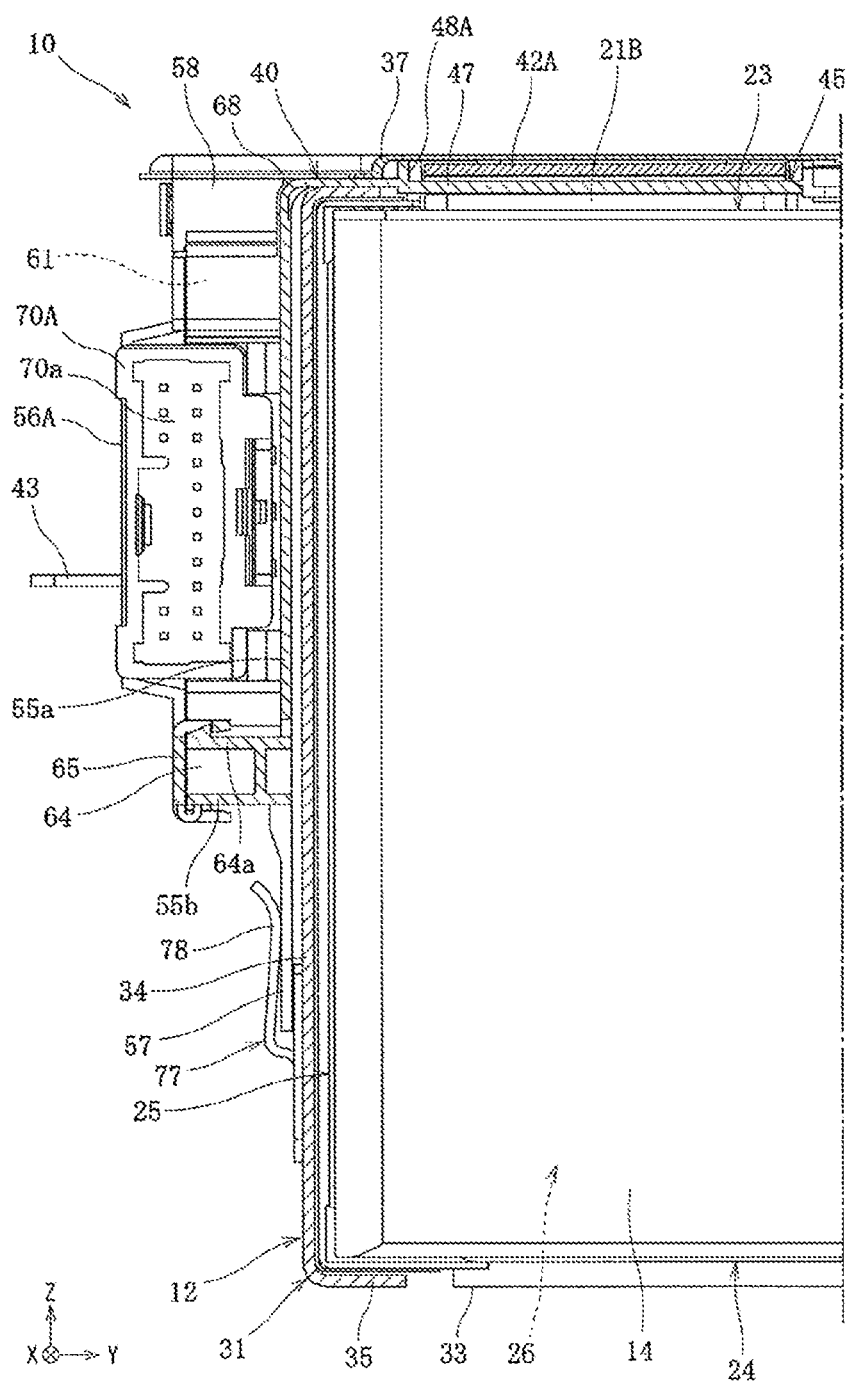
FIG. 1 is a cross-sectional view of an energy storage apparatus according to an embodiment of the present invention.

One aspect of the present invention provides an energy storage apparatus including: an energy storage device group in which a plurality of arrayed energy storage devices including terminals form a terminal surface where the terminals are disposed and a side surface intersecting the terminal surface; and a busbar frame holding a plurality of busbars that connects the terminals adjacent to each other. The busbar frame includes: a body holding the busbars and disposed on the terminal surface; a connector holder having a connector to which an external connector is connected, the connector holder being disposed on the side surface; and a coupling portion coupling the body and the connector holder.

According to the energy storage apparatus, the body for holding the busbar is disposed on the terminal surface of the energy storage device group, and the connector holder having the connector is disposed on the side surface of the energy storage device group, thereby enabling a reduction in the dimension of the energy storage apparatus in a direction in which the terminal of the energy storage device protrudes.

The coupling portion couples the connector holder to the body variably between a first posture located along the terminal surface and a second posture located along the side surface. According to this aspect, it is possible to improve the workability of installing wires electrically connected to the connector. More specifically, the connector holder is put in a first posture located in a plane with the body, and after the work of installing the wires in this state, the connector holder is put in a second posture located along the side surface of the energy storage device group. Thereby, the wire can be easily and reliably installed without causing swelling in the curved section of the wire located at the corners of the body and the connector holder.

The coupling portion is formed integrally with the body and the connector holder and is bendable with respect to the body and the connector holder. According to this aspect, the number of parts can be reduced as compared to a case where the body and the connector holder are constituted separately and integrated by a coupling portion having a hinge structure. The unintended detachment of the connector holder from the body can be prevented, thus improving the convenience in handling.

The energy storage device group further includes an outer case surrounding an outer periphery that includes the side surface and having the terminal surface located at one end, and the outer case is provided with a locking portion that locks the connector holder in the second posture. According to this aspect, since the unintended displacement of the connector holder can be prevented, the convenience in handling the energy storage apparatus can be improved.

A binding portion surrounding a plurality of wires connected to the connector is formed at an end portion of the connector holder located on the body side. According to this aspect, it is possible to effectively prevent the swelling and dispersion of the curved section of the wire located at the corners of the body and the connector holder.

In the connector holder, a void in which the wires are installed is formed around the connector. According to this aspect, it is possible to prevent the dispersion of the wires on the side surface of the energy storage device group. The wires are not exposed to the outside of the connector holder, whereby it is possible to prevent the entanglement of other members to the wire, and improve the convenience in handling.

At least one surface of an outer wall constituting the binding portion or the void is made of an openable and closable cover. According to this aspect, it is possible to improve the workability of installing wires.

A direction in which the external connector is connected to the connector is located parallel to the side surface. According to this aspect, the external connector and the wire connected to the external connector can be prevented from protruding outward from the energy storage device group, so that the dimension of the energy storage device group on the side surface side can also be reduced.

The connector includes a first connector and a second connector juxtaposed against each other.

Another aspect of the present invention provides an energy storage apparatus including: an energy storage device group in which a plurality of arrayed energy storage devices including terminals form a terminal surface where the terminals are disposed and a side surface intersecting the terminal surface; and a connector to which an external connector is connected. The connector is disposed on the side surface of the energy storage device group.

According to the energy storage apparatus, the connector is disposed on the side surface of the energy storage device group, thereby enabling a reduction in the dimension of the energy storage apparatus in a direction in which the terminal of the energy storage device protrudes.

Hereinafter, embodiments of the present invention will be described with reference to the drawings.

Figure 2:
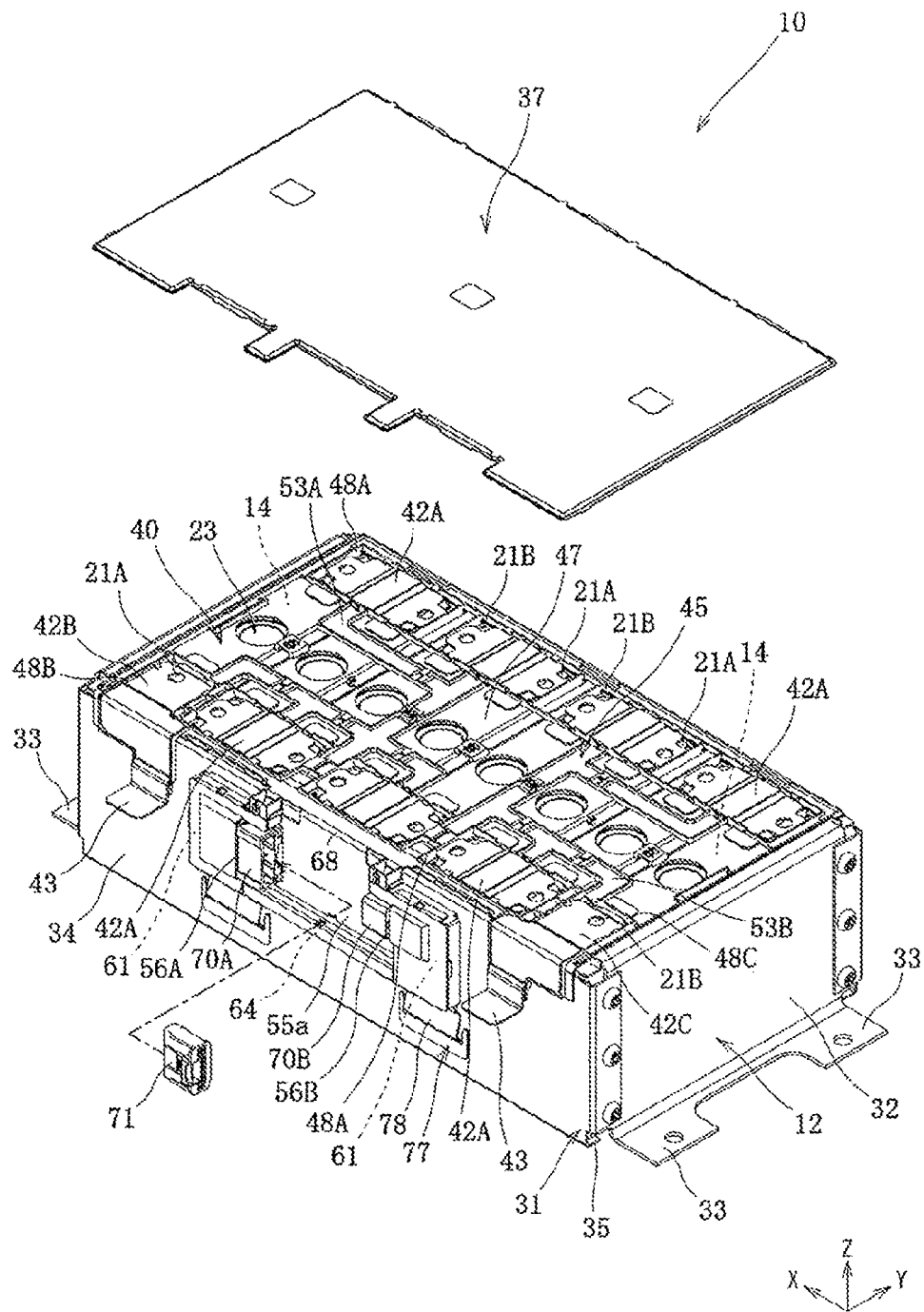
FIG. 2 is a perspective view of the energy storage apparatus.
Figure 3:
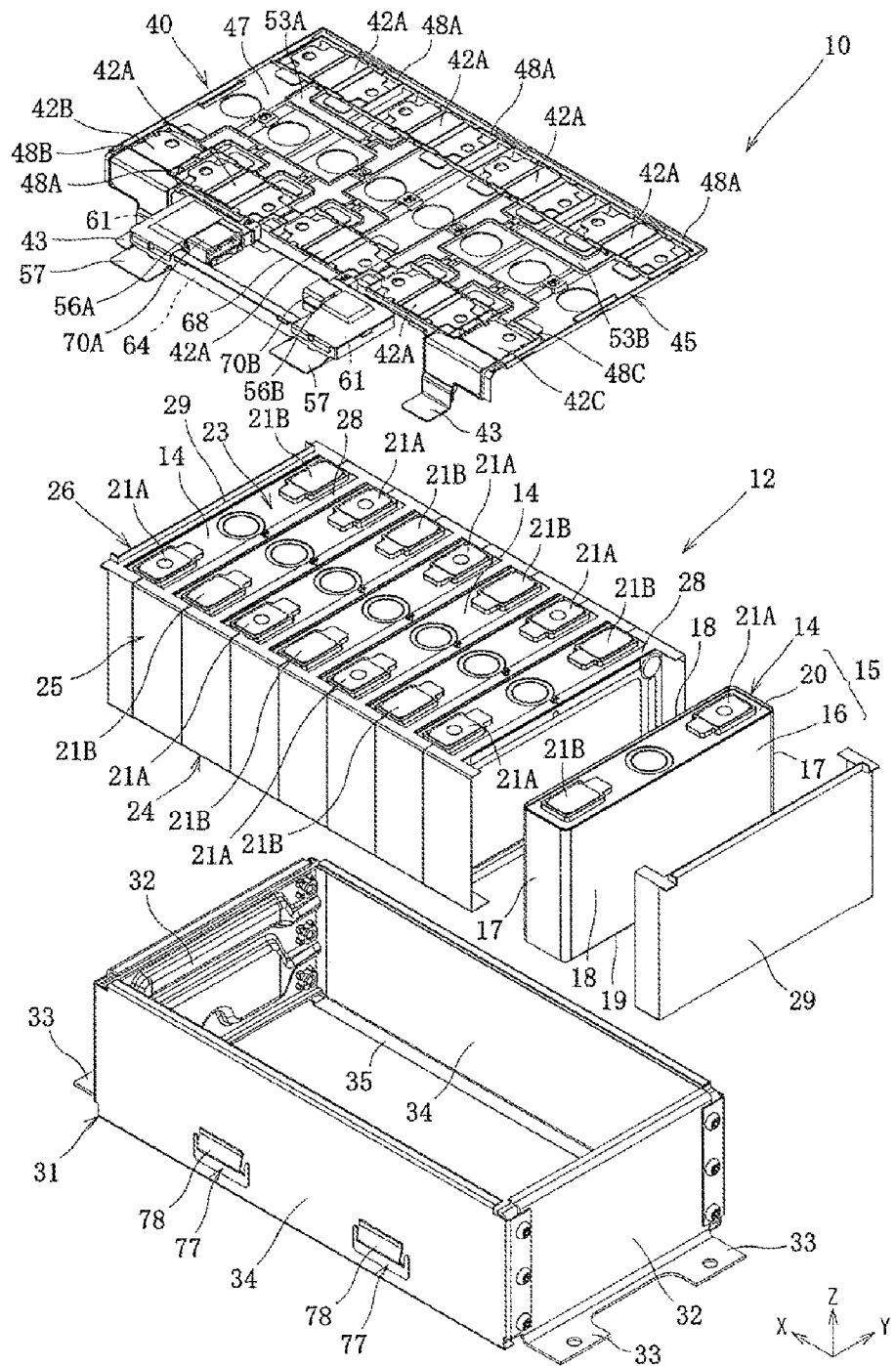
FIG. 3 is an exploded perspective view of the energy storage apparatus.

FIGS. 1 to 3 illustrate an energy storage apparatus 10 according to an embodiment of the present invention. The energy storage apparatus 10 includes a battery module 12 made up of a plurality (eight in the present embodiment) of battery cells (energy storage devices) 14, and a busbar unit 40 disposed on a terminal surface 23 of the battery module 12. In the present embodiment, connectors 70A, 70B which are disposed in the busbar unit 40 are disposed on a long side-surface 25 (side plate 34) different from the terminal surface 23 to reduce the energy storage apparatus 10 in the total height.

In the following description, the longitudinal direction (short direction of the battery cell 14) of the battery module 12 is referred to as the X-direction. The short direction (the longitudinal direction of the battery cell 14) of the battery module 12 is referred to as the Y-direction. The height direction of the battery module 12 (battery cell 14) is referred to as the Z-direction.

(Overview of Battery Module)

As illustrated most clearly in FIG. 3, the battery module 12 has the battery cells 14 arrayed in the X-direction. The battery module 12 is housed in a square cylindrical outer case 31 and is restrained by the outer case 31.

A nonaqueous electrolyte secondary battery such as a lithium ion battery is used as the battery cell 14. However, in addition to the lithium ion battery, various battery cells 14 including a capacitor can also be applied. Each of the battery cells 14 has a configuration in which an electrode assembly (not illustrated) formed by laminating and winding electrode sheets of a positive electrode and a negative electrode via a separator, a current collector (not illustrated) of the positive electrode and the negative electrode, and an electrolyte solution are stored inside a container 15.

The container 15 is prismatic and includes a flat container body 16 having one surface (the upper surface in the Z-direction) open, and a lid 20 for closing the opening of the container body 16. The container body 16 is a box body including a pair of short side-walls 17 extending along the XZ plane, a pair of long side-walls 18 extending along the YZ plane, and a bottom wall 19 extending along the XY plane. The dimension of the short side-wall 17 in the X-direction is shorter than the dimension of the long side-wall 18 in the Y-direction. The lid 20 is liquid-tightly attached to the upper opening of the container body 16. The container body 16 and the lid 20 are both made of aluminum or stainless steel and sealed by welding.

On the lid 20, a positive terminal 21A is disposed on one end side in the Y-direction, and a negative terminal 21B is disposed on the other end side in the Y-direction. As described above, in the battery module 12, the positive terminal 21A and the negative terminal 21B are disposed only on one end surface. The positive terminal 21A is electrically connected to the positive current collector and is electrically connected to the positive electrode sheet of the electrode assembly via the positive current collector. The negative terminal 21B is electrically connected to the negative current collector and is electrically connected to the negative electrode sheet of the electrode assembly via the negative current collector.

As illustrated in FIGS. 1 to 3, the battery cell 14 is disposed such that the terminals 21A, 21B are located on the upper side in the Z-direction. Spacers 28 are disposed between adjacent battery cells 14, and end spacers 29 are disposed at both ends in the X-direction of the disposed battery cell 14 group. The upper side in the Z-direction of the battery cell 14 group constitutes the terminal surface 23 on which the terminals 21A, 21B are disposed. The terminals 21A, 21B are not disposed on a bottom surface 24 (the lower side in the Z-direction) of the battery cell 14 group located on the side opposite to the terminal surface 23. The outer periphery of the battery cell 14 group includes a long side-surface 25 and a short side-surface 26 extending in the direction orthogonal to the terminal surface 23.

The outer case 31 is made of metal and surrounds the outer periphery of the battery cell 14 group to restrain the battery cell 14 to be immovable. Note that the battery cell 14 group may have the outer case 31. The outer case 31 includes a pair of end plates 32 extending along the YZ plane and a pair of side plates 34 extending along the XZ plane. The dimension of the end plate 32 in the Y-direction is shorter than the dimension of the side plate 34 in the X-direction. The lower end of the end plate 32 is provided with a bracket 33 that protrudes outward of the outer case 31 and fixes the energy storage apparatus 10 to an object to be mounted, such as a vehicle body. The lower end of the side plate 34 is provided with a holding piece 35 that protrudes inward of the outer case 31 and holds the outer periphery of the bottom surface 24 of the battery cell 14 group. Note that the outer case 31 may be a resin case.

After the end plate 32 is disposed outside the end spacer 29 of the battery cell 14 group, the side plate 34 is disposed outside the long side-surface 25 of the battery cell 14 group. By screwing and integrating the end plate 32 and the side plate 34, the plurality of battery cells 14 are restrained to be immovable. Thus, the terminal surface 23 of the battery module 12 is located at the upper-end opening of the cylindrical outer case 31. The busbar unit 40 is disposed on the upper side of the terminal surface 23, and the further upper side thereof is closed by a resin lid 37.

(Overview of Busbar Unit)

Figure 4:
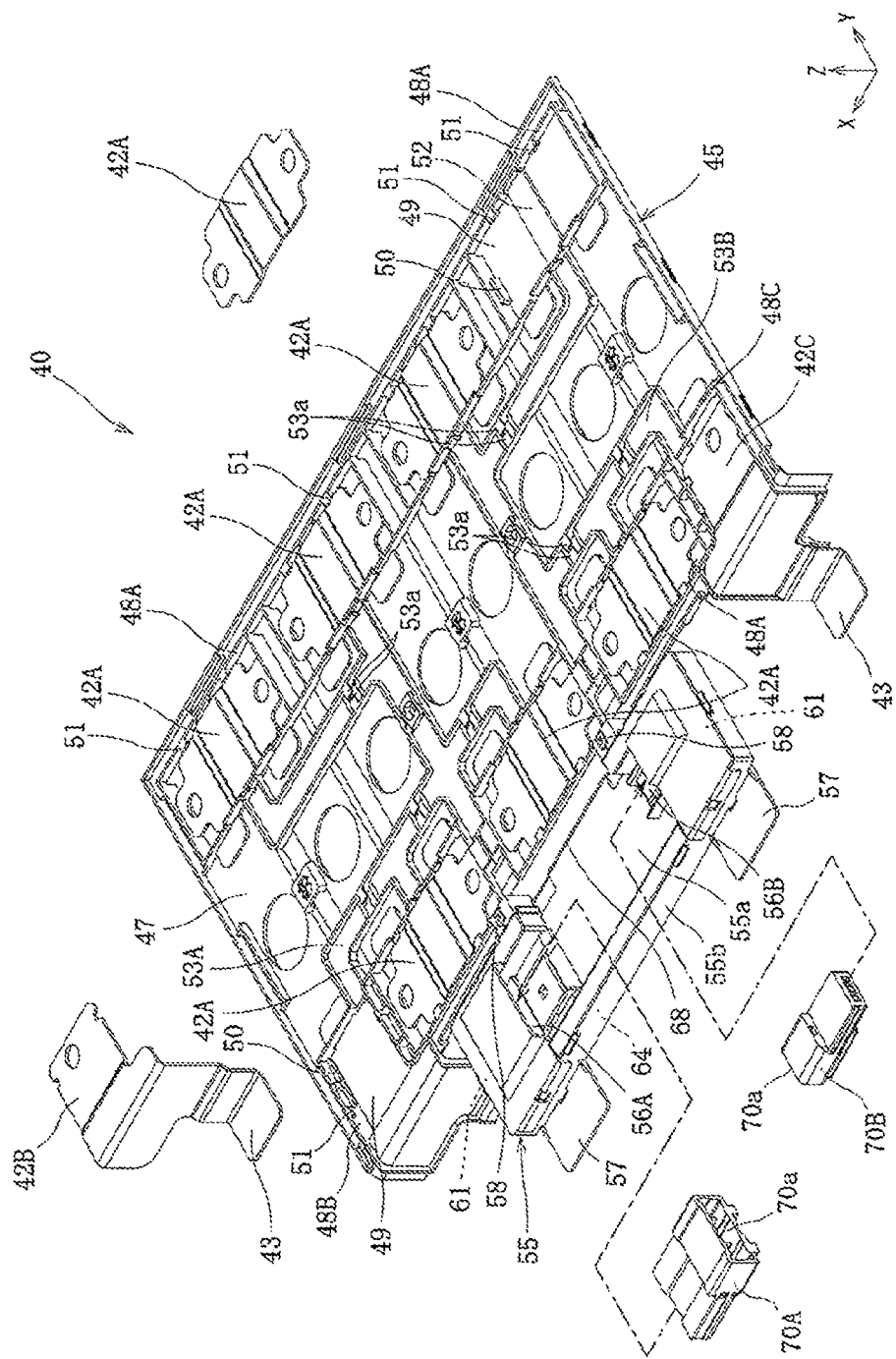
FIG. 4 is an exploded perspective view of a busbar frame.

As illustrated in FIGS. 2 to 4, the terminals 21A, 21B of adjacent battery cells 14 are electrically connected by a plurality (seven sheets in the present embodiment) of busbars 42A. The busbars 42B, 42C are electrically connected to the terminals 21A, 21B of the battery cell 14 located at the ends in a direction of current flow. The busbars (conductive members) 42A to 42C of the present embodiment are held by a busbar frame 45 and integrated as the busbar unit 40.

Figure 5:
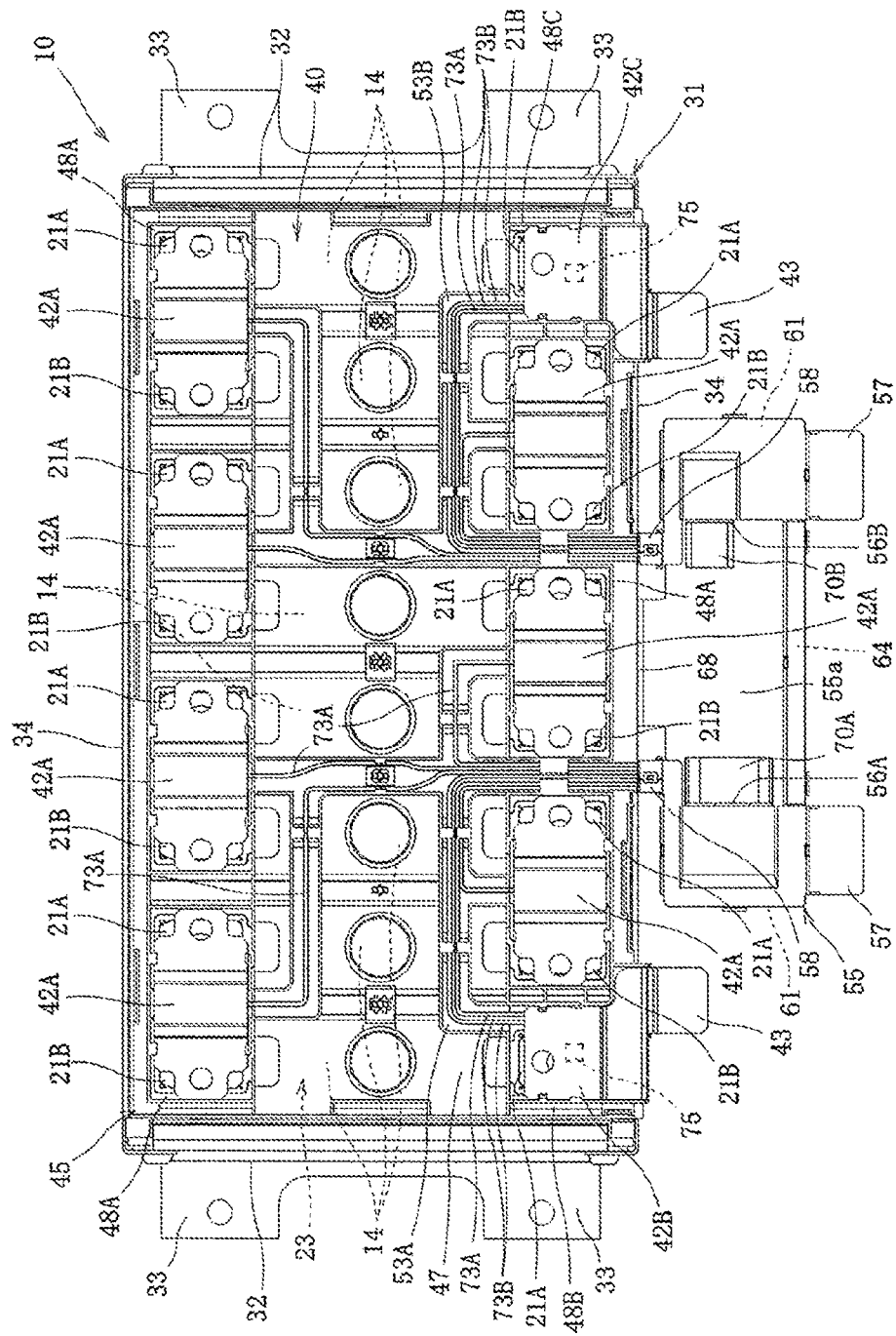
FIG. 5 is a plan view illustrating a state where wires are installed on a frame body.
Figure 6:
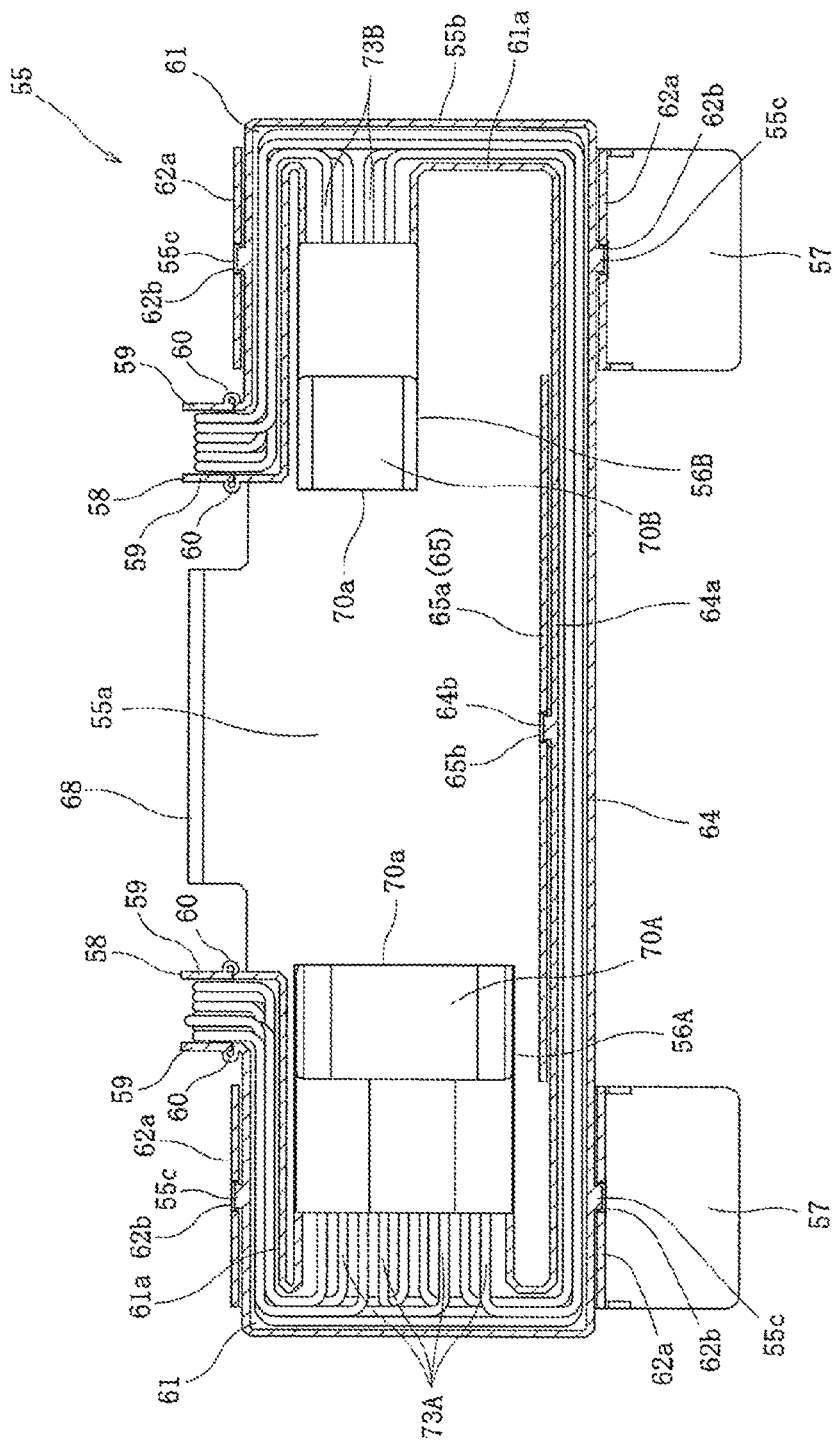
FIG. 6 is a cross-sectional view illustrating a state where wires are installed on a connector holder.

The busbar unit 40 is formed by disposing the busbars 42A to 42C and the connectors 70A, 70B for communication on the resin busbar frame 45. Referring to FIGS. 5 and 6, wires 73A, 73B for communication are installed on a frame body 47 and a connector holder 55.

The busbar 42A electrically connects between the positive terminals 21A of the adjacent battery cells 14, between the negative terminals 21B of the adjacent battery cells 14, or between the positive terminal 21A and the negative terminal 21B. The busbar 42B is electrically connected to the positive terminal 21A of the battery cell 14 located at the end in the direction of current flow. The busbar 42C is electrically connected to the negative terminal 21B of the battery cell 14 located at the end opposite to the busbar 42B. The busbars 42B, 42C of the present embodiment are integrally provided with external terminals 43, respectively. These external terminals 43 protrude outward from between the upper end of the outer case 31 (side plate 34) and the lid 37 (cf. FIG. 1).

In the case of series connection, the positive terminals 21A and the negative terminals 21B of the predetermined battery cells 14 are electrically connected by the busbars 42A. In the case of parallel connection, the positive terminals 21A of the predetermined battery cells 14 are electrically connected to each other by the busbar 42A, and the negative terminals 21B of the predetermined battery cells 14 are electrically connected to each other by the busbar 42A. In the present embodiment, a case is shown where a plurality of battery cells 14 are connected in series, and the busbars 42A are electrically connected to the positive terminals 21A and the negative terminals 21B of the battery cells 14 adjacent in the X-direction. However, two or more battery cells 14 may be taken as one set, and in the same set, the positive terminals 21A of the battery cells 14 may be electrically connected to each other by the busbar 42A, while in different sets, the positive terminal 21A of the battery cell 14 and the negative terminal 21B of the battery cell 14 may be electrically connected to each other by the busbar 42A.

The busbar frame 45 includes the frame body 47 for holding busbars 42A to 42C, the connector holder 55 for holding connectors 70A, 70B, and a coupling portion 68 for connecting the frame body 47 and the connector holder 55. The frame body 47 is disposed on the terminal surface 23, and the connector holder 55 is disposed on the long side-surface 25 via the side plate 34.

As illustrated in FIG. 4, the frame body 47 includes attachment portions 48A to 48C for attachment of the busbars 42A to 42C. Four attachment portions 48A for attachment of the busbars 42A are provided at intervals in the X-direction at one end side in the Y-direction. On the other end side in the Y-direction, the attachment portion 48B for attachment of the busbar 42B is provided at one end in the X-direction, the attachment portion 48C for attachment of the busbar 42C is provided at the other end in the X-direction, and three attachment portions 48A for attachment of the busbar 42A are provided therebetween.

Each of the attachment portions 48A to 48C has a through hole 49 through which the terminals 21A, 21B of the battery cell 14 pass. The inner periphery of the through hole 49 is provided with a first locking protrusion 50 for locking the lower surfaces (battery cell 14 side) of the busbars 42A to 42C, and a second locking protrusion 51 for locking the upper surfaces (lid 37 side) of the busbars 42A to 42C. The attachment portion 48A for the busbar 42A is provided with a holder 52 for holding the lower surface of the busbar 42A. The holder 52 extends in the Y-direction so as to be located between the terminals 21A, 21B adjacent in the X-direction. The holder 52 is not provided in the attachment portions 48B, 48C for the busbars 42B, 42C.

Referring also to FIG. 5, the frame body 47 is provided with wiring grooves 53A, 53B for installation of the wires 73A, 73B. The wiring grooves 53A, 53B are concave recesses opened on the upper surface side (lid 37 side) of the frame body 47 and are formed on one end side and the other end side in the X-direction with the center of the frame body 47 as a reference. The wiring grooves 53A, 53B are branched so as to communicate with all the attachment portions 48A to 48C.

The connector holder 55 is provided with attachment portions 56A, 56B for attachment of the connectors 70A, 70B. Referring also to FIG. 6, at the end portion of the connector holder 55 located on the frame body 47 side, a square cylindrical binding portion 58 surrounding the wires 73A, 73B is formed. The connector holder 55 is provided with a pair of voids 61 around the attachment portions 56A, 56B (connectors 70A, 70B) and is provided with a communication portion 64 for communicating the voids 61.

The coupling portion 68 is formed integrally with the frame body 47 and the connector holder 55 and is provided at the center of the frame body 47 and the connector holder 55 in the X-direction and at a section corresponding to the binding portion 58.

The connectors 70A, 70B are for electrically connecting the energy storage apparatus 10 and external equipment (e.g., battery monitoring unit (BMU)) and are attached to the attachment portions 56A, 56B of the connector holder 55. The connector 70A makes the voltage of each battery cell 14 communicable to the external equipment, and the connector 70B makes the temperature of the battery cell 14 communicable to the external equipment. Note that the temperature sensor 75 is disposed in the battery cell 14 at each of both ends where the busbars 42B, 42C are disposed.

As illustrated in FIGS. 5 and 6, the wire 73A electrically connected to all the busbars 42A to 42C is connected to the connector 70A, and an external connector 71 (cf. FIG. 2) connected to the external equipment is connected to the connector 70A. The wire 73B of the temperature sensor 75 is connected to the connector 70B, and an external connector (not illustrated) connected to the external equipment is connected to the connector 70B.

In this energy storage apparatus 10, the busbars 42A to 42C are disposed in the frame body 47, and the frame body 47 is disposed on the terminal surface 23 of the battery module 12. The connectors 70A, 70B are disposed in the connector holder 55, and the connector holder 55 is disposed between the side plate 34 (long side-surface 25) of the battery module 12, that is, the terminal surface 23, and a bottom surface 24 of the battery module 12.

As described above, in the energy storage apparatus 10 of the present embodiment, the connectors 70A, 70B for communication are not disposed on the terminal surface 23 of the battery module 12 where the terminals 21A, 21B protrude. That is, it is not necessary to ensure a space for placing the connectors 70A, 70B, the external connector 71, and the wires connected to the external connector 71 on the terminal surface 23 side of the battery module 12. Hence it is possible to reduce the dimension of the energy storage apparatus 10 in the Z-direction in which the terminals 21A, 21B protrude. As a result, it is possible to respond to a request from a manufacturer (e.g., automobile manufacturer) for reducing the size of the energy storage apparatus 10.

Further, in the battery module 12, since the positive terminal 21A and the negative terminal 21B are disposed only on one end surface, the busbar unit 40 may also be disposed only on one surface (the upper surface in the present embodiment), thereby enabling a reduction in size of the energy storage apparatus 10.

Note that the connector holder 55 may be in contact with the side plate 34 (long side-surface 25) of the battery module 12 or may be disposed with a gap therebetween. That is, the connector holder 55 only needs to face the long side-surface 25. Further, in order to reduce the energy storage apparatus 10 in the height direction, the connector holder 55 and the connectors 70A, 70B are desirably accommodated within the range of the long side-surface 25, but the upper end portion of at least one of the connector holder 55 and the connectors 70A, 70B may protrude from the long side-surface 25.

(Details of Busbar Frame)

As illustrated in FIGS. 1 to 3, the busbar frame 45 is formed by coupling the connector holder 55 to the frame body 47 with the coupling portion 68 so as to make the connector holder 55 deformable into a first posture and a second posture. As illustrated most clearly in FIG. 1, the coupling portion 68 is formed thinner than the frame body 47 and the connector holder 55 so as to have flexibility. Thus, the coupling portion 68 is configured to be bendable with respect to the frame body 47 and the connector holder 55.

In the first posture illustrated in FIG. 3, the connector holder 55 is located in parallel along the terminal surface 23 and is located on a plane with respect to the frame body 47. In the second posture illustrated in FIGS. 1 and 2, the connector holder 55 is located along the long side-surface 25 and is located in a direction orthogonal to the frame body 47 toward the bottom surface 24. Naturally, the connector holder 55 can also be displaced from the second posture to a posture located above the frame body 47 beyond the first posture.

The outer case 31 is provided with a pair of locking portions 77 for locking the connector holder 55 in the second posture. The locking portion 77 is made of a plate spring and has an elastic piece 78 energized toward the side plate 34. The locking portion 77 is fixed to one side plate 34 so as to be located below the connector holder 55. The connector holder 55 is provided with a pair of locking pieces 57 at positions corresponding to the locking portions 77. By inserting the locking piece 57 between the elastic piece 78 and the side plate 34, the connector holder 55 is locked to the battery module 12 in the second posture.

For example, the work of installing the wires 73A, 73B on the busbar frame 45 is performed as follows. First, the frame body 47, in which the busbars 42A to 42C are disposed, is disposed on the terminal surface 23 of the battery module 12, and the terminals 21A, 21B and the busbars 42A to 42C are joined by welding. Next, the connector holder 55 is put in the first posture, the wire 73A is connected to each of the busbars 42A to 42C, and the wire 73A is installed from the frame body 47 to the connector holder 55 to connect the wire 73A to the connector 70A. The wire 73B connected to the temperature sensor 75 is installed from the frame body 47 to the connector holder 55 to connect the wire 73B to the connector 70B. Thereafter, the connector holder 55 is put in the second posture.

As thus described, the wires 73A, 73B are installed to the connector holder 55 put in the first posture, and then the connector holder 55 is put in the second posture, so that it is possible to prevent the swelling of the curved sections of the wires 73A, 73B located at the corners of the frame body 47 and the connector holder 55. The wires 73A, 73B can be installed on the planar busbar frame 45, thereby making the workability highly favorable. Hence the wires 73A, 73B can be installed easily and reliably.

Due to the integral formation of the frame body 47 and the connector holder 55 via the coupling portion 68, the number of parts can be reduced as compared to a case where the frame body and the connector holder are separately configured and integrated by a coupling portion in a hinge structure. Furthermore, the unintended detachment of the connector holder 55 from the frame body 47 can be prevented, thus improving the convenience in handling.

Since the connector holder 55 can be locked in the second posture by the locking portion 77, the unintended displacement of the connector holder 55 can be prevented. It is thereby possible to improve the convenience in handling the energy storage apparatus 10. The connection work of the external connector 71 is performed in this state, so that the connection workability can also be improved.

(Details of Wire Arrangement Structure)

As described above, in order to install the wires 73A, 73B, the frame body 47 is provided with the wiring grooves 53A, 53B, and the connector holder 55 is provided with the binding portion 58, the void 61, and the communication portion 64.

As illustrated in FIGS. 4 to 6, the wiring grooves 53A, 53B are concave recesses, and a regulating protrusion 53a protruding into the groove is provided at the upper end of a prescribed position. The regulating protrusion 53a covers a part of each of the wiring grooves 53A, 53B, and prevents the floating of each of the wires 73A, 73B. The ends of the wiring grooves 53A, 53B located on the frame body 47 side are opened so as to face the binding portion 58.

Figure 7:
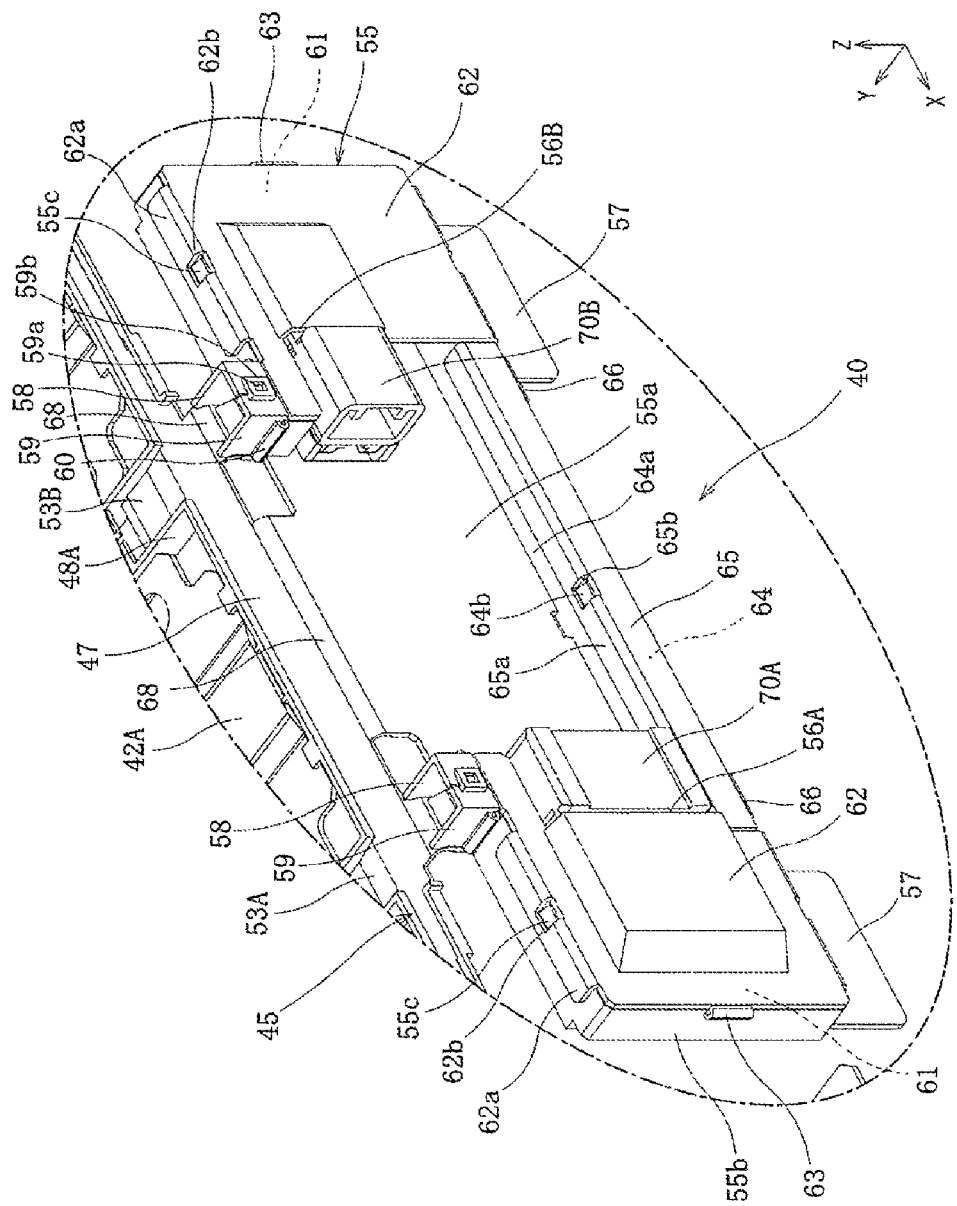
FIG. 7 is an upper perspective view of the connector holder.
Figure 8:
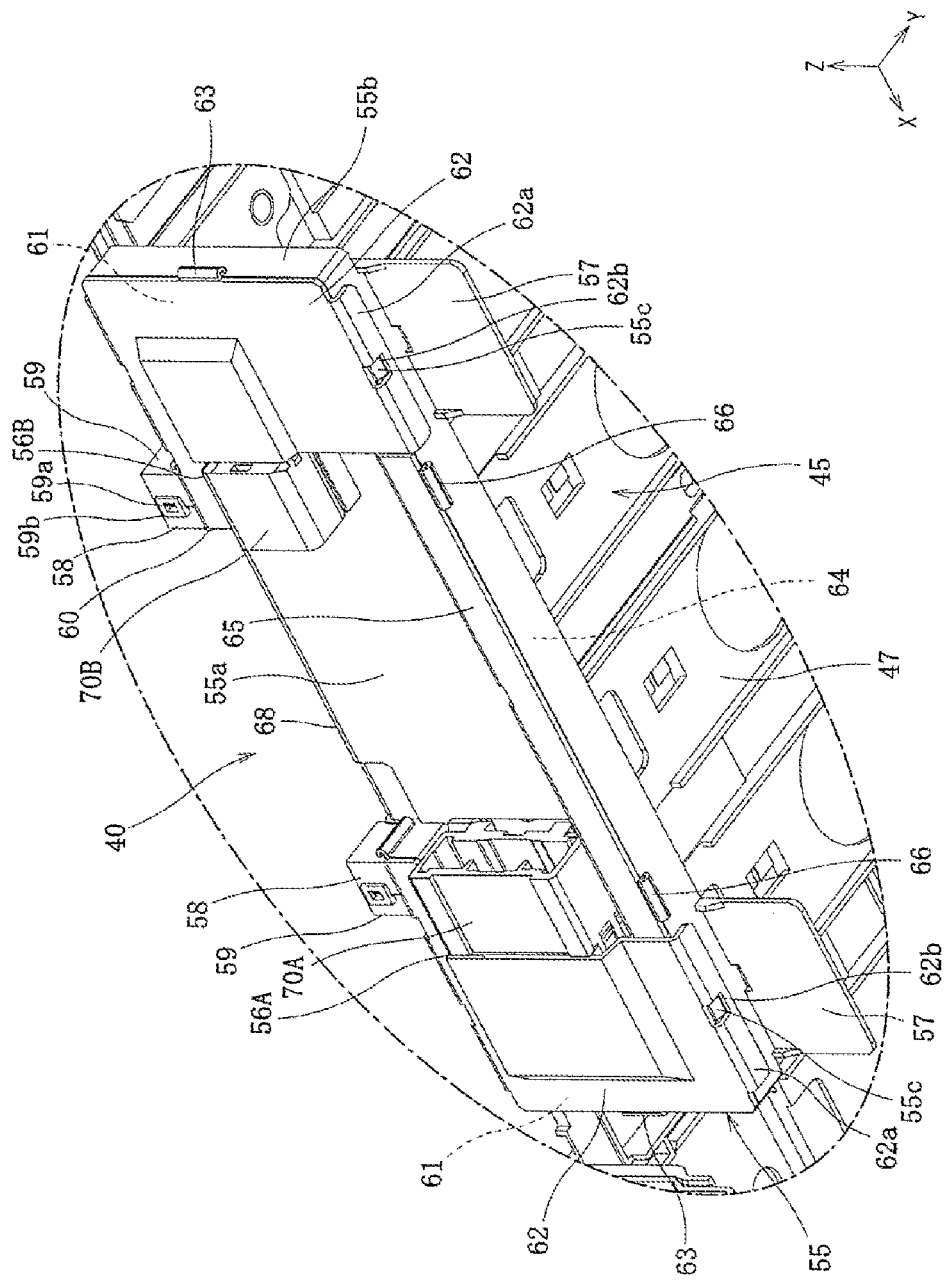
FIG. 8 is a lower perspective view of the connector holder.

As illustrated in FIGS. 6 to 8, the connector holder 55 includes a substrate 55a continuous to the coupling portion 68, and a frame plate 55b protruding outward from the outer peripheral edge of the substrate 55a. The frame plate 55b is not provided between the pair of binding portions 58. The attachment portions 56A, 56B for attachment of the connectors 70A, 70B are provided on both sides of the substrate 55a in the X-direction. The binding portion 58 is provided at the end of the substrate 55a located on the frame body 47 side, the void 61 is provided around the attachment portions 56A, 56B, and the communication portion 64 is provided at the end of the substrate 55a located away from the coupling portion 68.

Figure 9:
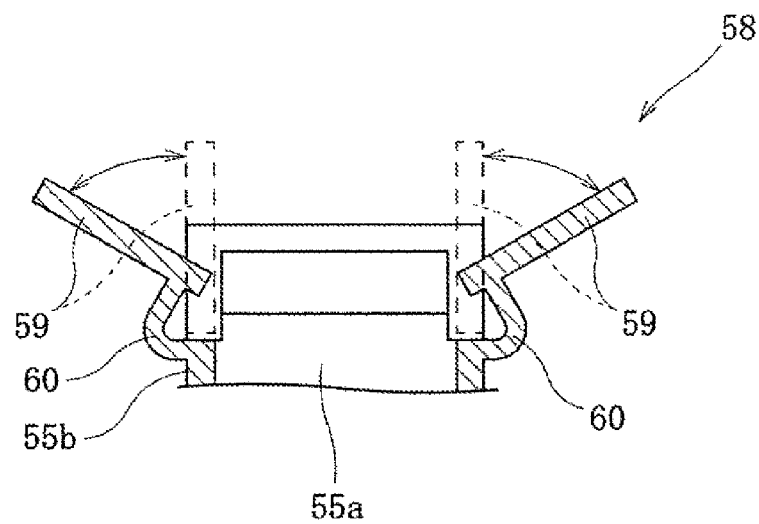
FIG. 9 is a cross-sectional view of a binding portion of the connector holder.

Referring to FIG. 7 together with FIG. 9, the binding portion 58 has a square cylindrical shape with an open end located on the frame body 47 side and is rotatable with respect to the frame body 47 together with the connector holder 55. The outer wall of the square cylindrical shape constituting the binding portion 58 is made up of a part of the substrate 55a continuous to the coupling portion 68 and a pair of covers 59 having an L-shape as viewed from the opening of the binding portion 58.

The pair of covers 59 are provided integrally with the frame plate 55b (Frame Body 47) by elastically deformable coupling portions 60. One cover 59 is provided with a locking protrusion 59a, and the other cover 59 is provided with a locking frame 59b detachably locked to the locking protrusion 59a.

Figure 10:
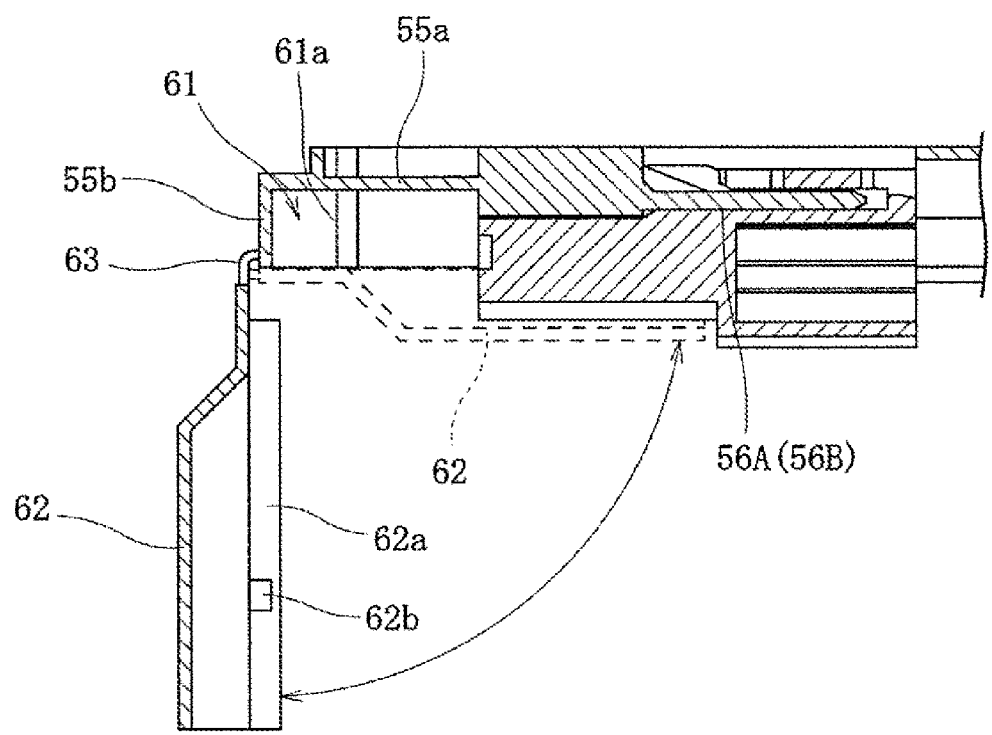
FIG. 10 is a cross-sectional view of a void of the connector holder.

Referring to FIGS. 6 to 8 together with FIG. 10, the void 61 communicates with the binding portion 58, extends outwardly in the X-direction on the frame body 47 side of the attachment portions 56A, 56B and extends away from the frame body 47 at the outer end of the substrate 55a in the X-direction. On the outer side of the connector holder 55 in the X-direction, the void 61 communicates with the attachment portions 56A, 56B. The void 61 is defined by the frame plate 55b, an inner frame plate 61a provided with a space from the frame plate 55b, and an openable and closable cover 62.

The cover 62 constitutes one surface of an outer wall surrounding the void 61. The cover 62 is integrally provided with the frame plate 55b by an elastically deformable connection portion 63. The cover 62 includes a locking piece 62a disposed on the outer surface of the frame plate 55b. A locking protrusion 55c is provided on the frame plate 55b, and a locking hole 62b is provided in the locking piece 62a.

Figure 11:
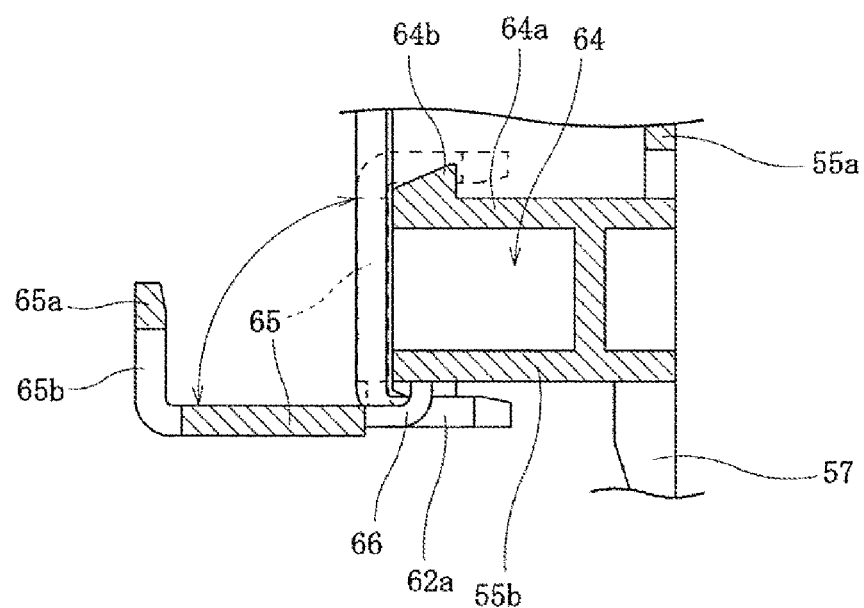
FIG. 11 is a cross-sectional view of a communication portion of the connector holder.

Referring to FIGS. 6 to 8 together with FIG. 11, the communication portion 64 communicates with the voids 61, located at both ends of the connector holder 55 in the X-direction, at the outer end of the substrate 55a farthest from the frame body 47. The communication portion 64 is defined by the frame plate 55b, an inner frame plate 64a provided with a space from the frame plate 55b, and an openable and closable cover 65.

The cover 65 constitutes one surface of an outer wall surrounding the communication portion 64. The cover 65 is integrally provided with the frame plate 55b by an elastically deformable connection portion 66. The cover 65 includes a locking piece 65a disposed on the outer surface of the inner frame plate 64a. A locking protrusion 64b is provided on the inner frame plate 64a, and the locking piece 65a is provided in a locking hole 65b.

The wires 73A, 73B are installed with the connector holder 55 put in the first posture as illustrated in FIGS. 4 and 5 and with the covers 59, 62, 65 set in an open state as illustrated in FIGS. 9 to 11. The wires 73A, 73B are installed along the wiring grooves 53A, 53B, and then installed in the opened binding portion 58.

Five wires 73A for voltage and two wires 73B for temperature are installed in the wiring groove 53A. These wires 73A, 73B are installed from the binding portion 58 to the void 61 on the left side in FIG. 6. The wire 73A for voltage is connected to the connector 70A. The wire 73B for temperature is installed through the communication portion 64 to the air void 61 on the right side in FIG. 6, and is connected to the connector 70B.

Four wires 73A for voltage are installed in the wiring groove 53B, and two wires 73B for temperature are installed in the wiring groove 53B. These wires 73A, 73B are installed from the binding portion 58 to the void 61 on the right side in FIG. 6. The wire 73B for temperature is connected to the connector 70B. The wire 73A for voltage is installed through the communication portion 64 to the air void 61 on the left side in FIG. 6, and is connected to the connector 70A.

When the installation of all the wires 73A, 73B is completed, the covers 59, 62, 65 are closed, and the connector holder 55 is shifted to the second posture to lock the locking piece 57 to the locking portion 77.

As described above, the wires 73A, 73B are installed in the wiring grooves 53A, 53B of the frame body 47 opened upward, and in the binding portion 58, the void 61, and the communication portion 64 of the connector holder 55 opened upward by opening the covers 59, 62, 65. It is thus possible to significantly improve the workability of installing the wires 73A, 73B.

The curved sections of the wires 73A, 73B located at the corners of the frame body 47 and the connector holder 55 come into the state of being surrounded by the binding portion 58, so that outward swelling and dispersion can be prevented effectively.

Furthermore, with the wires 73A, 73B being installed in the closed void 61 and the communication portion 64 in the connector holder 55, the dispersion of the wires 73A, 73B on the side surface of the battery module 12 can be prevented. The wires 73A, 73B are not exposed to the outside of the connector holder 55, so that entanglement with other members can also be prevented. Accordingly, it is possible to significantly improve the convenience in handling the energy storage apparatus 10.

(Details of the Connector Attachment Structure)

As illustrated in FIGS. 1 and 2, the attachment portions 56A, 56B of the connector holder 55 are provided such that a direction in which the external connector 71 is connected to the connectors 70A, 70B is located parallel to the side plate 34. That is, the attachment portions 56A, 56B are provided such that the openings 70a of the connectors 70A, 70B are opened in a direction orthogonal to the XZ plane where the side plate 34 extends.

The pair of attachment portions 56A, 56B are provided side by side in the array direction of the battery cells 14. That is, the pair of attachment portions 56A, 56B are provided with a space in the X-direction. As most clearly illustrated in FIG. 6, the attachment portions 56A, 56B are provided such that the opening 70a of the first connector 70A and the opening 70a of the second connector 70B face each other.

In a case where the external connector 71 is connected to the connectors 70A, 70B disposed in the connector holder 55, the external connector 71 is disposed between the connectors 70A, 70B. The external connector 71 is operated outward in the X-direction to be connected to the corresponding connectors 70A, 70B.

In a case where the openings of the first connector and the second connector are disposed in opposite directions, an operation is performed to dispose the external connectors on both outer sides of the respective connectors and connect the external connectors. In this case, it is necessary to ensure a space for connecting the external connectors on both sides of the two connectors.

On the other hand, in the present embodiment, as described above, the external connector 71 is disposed between the pair of connectors 70A, 70B, and a connection operation is performed. That is, the first connector 70A and the second connector 70B can share an operation space for connecting the external connector 71. Therefore, the shape of the connector holder 55 can be reduced as compared to a case where the openings of the first connector and the second connector are disposed in opposite directions.

With the external connector 71 connected, the external connector 71 and a wire (not illustrated) connected to the external connector 71 are in the state of being along the side plate 34 of the battery module 12. Hence the external connector 71 and the wire can be prevented from protruding outward in the Y-direction from the battery module 12. As a result, the lateral dimension of the energy storage apparatus 10 can also be reduced.

Note that the energy storage apparatus 10 of the present invention is not limited to the configuration of the above embodiment, but various modifications are possible.

(First Modification)

In the above embodiment, the case has been illustrated where the connectors 70A, 70B and the connector holder 55 are disposed on the long side-surface 25 of the battery cell 14 group via the side plate 34 In a first modification, a case will be illustrated where the connector and the connector holder are disposed on the short side-surface 26 of the battery cell 14 group.

Figure 12:
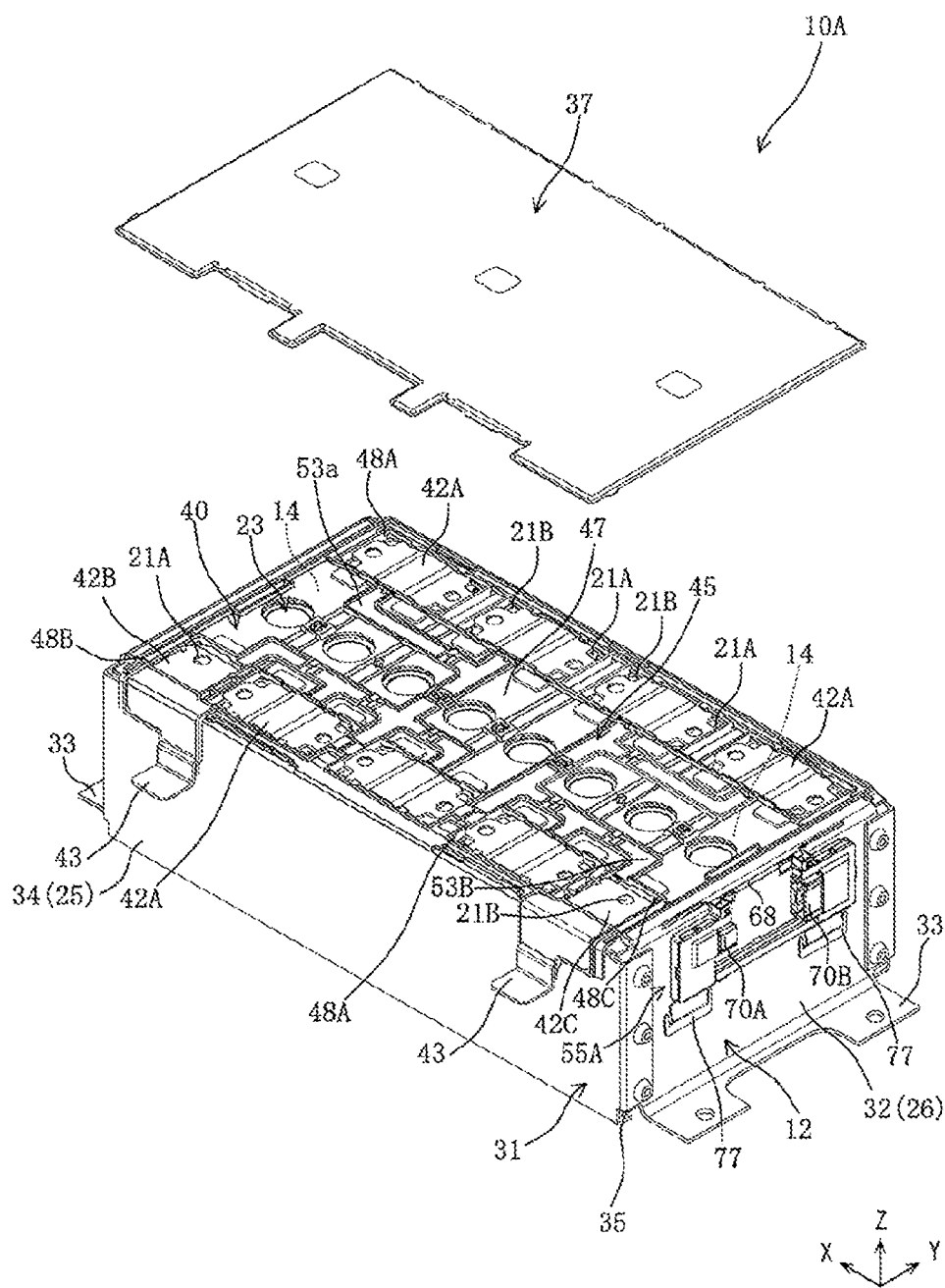
FIG. 12 is a perspective view of an energy storage apparatus according to a first modification.

FIG. 12 is a perspective view illustrating an energy storage apparatus 10A according to the first modification. In the following description, the same sections as those in the above embodiments may be denoted by the same reference numerals and the description thereof may be omitted.

As illustrated in FIG. 12, in the energy storage apparatus 10A, the connectors 70A, 70B are disposed in the connector holder 55A, and the connector holder 55A is provided on the end plate 32 (short side-surface 26) of the battery module 12. That is, even in this case, the connector holder 55A is disposed between the terminal surface 23 and the bottom surface 24 of the battery module 12.

As described above, in the energy storage apparatus 10A of the first modification as well, the connectors 70A, 70B for communication are not disposed on the terminal surface 23 of the battery module 12 where the terminals 21A, 21B protrude. That is, it is not necessary to ensure a space for disposing the connectors 70A, 70B, and the like, on the terminal surface 23 side of the battery module 12. Hence it is possible to reduce the dimension of the energy storage apparatus 10 in the Z-direction in which the terminals 21A, 21B protrude.

(Modification 2)

In the above embodiment, the case has been illustrated where the connectors 70A, 70B are disposed on the long side-surface 25 of the battery cell 14 group via the connector holder 55 In the second modification, an energy storage apparatus 10B having no connector holder will be described.

Figure 13:
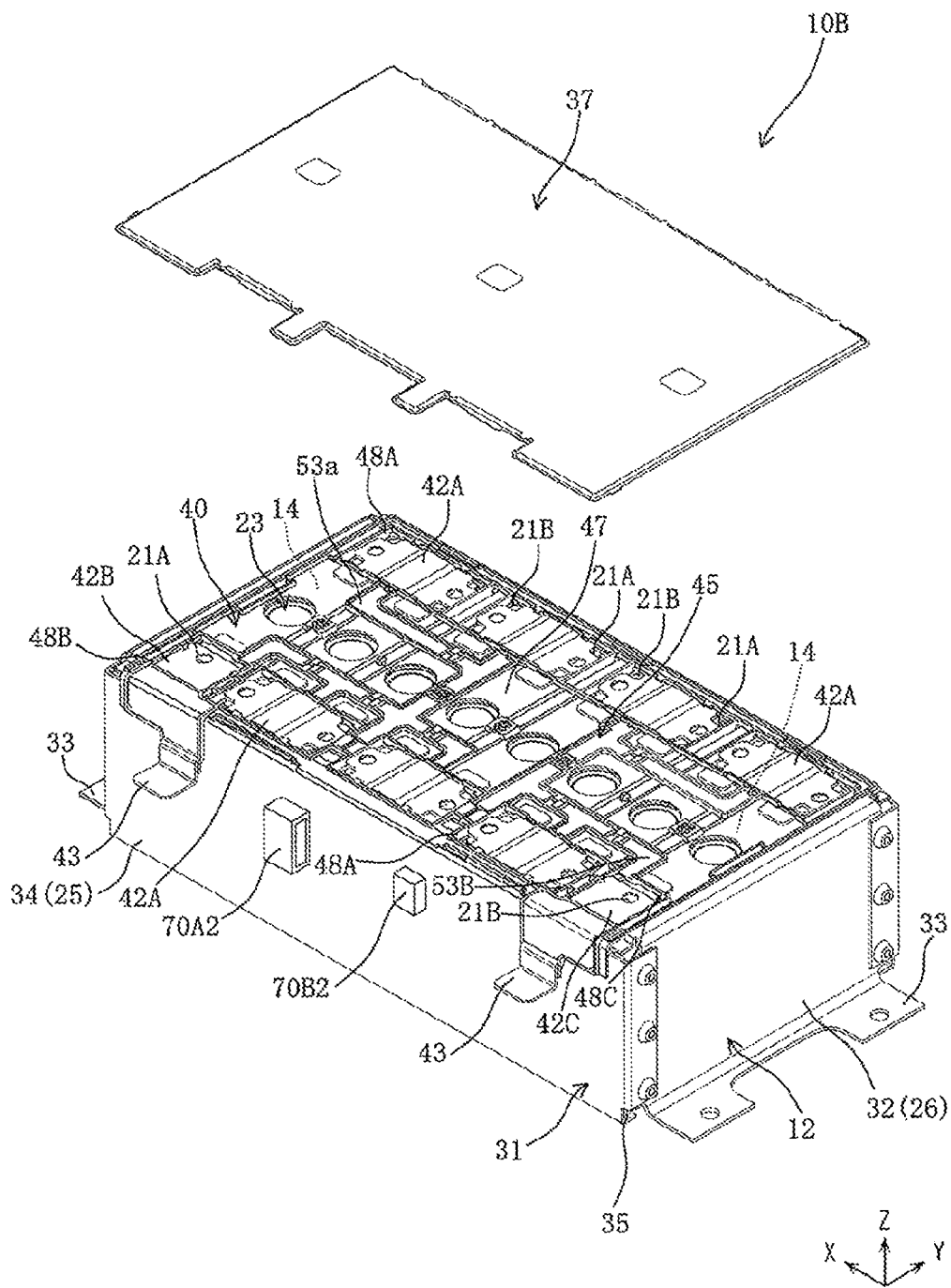
FIG. 13 is a perspective view of an energy storage apparatus according to a second modification.

FIG. 13 is a perspective view illustrating the energy storage apparatus 10B according to the second modification. In the following description, the same sections as those in the above embodiments may be denoted by the same reference numerals and the description thereof may be omitted.

As illustrated in FIG. 13, in the energy storage apparatus 10B, the connectors 70A2, 70B2 are disposed on the long side-surface 25 via the side plate 34. In this case as well, the connectors 70A2, 70B2 are disposed between the terminal surface 23 and the bottom surface 24 of the battery module 12. As described above, in the energy storage apparatus 10B of the second modification as well, the connectors 70A2, 70B2 for communication are not disposed on the terminal surface 23 of the battery module 12 where the terminals 21A, 21B protrude. That is, it is not necessary to ensure a space for disposing the connectors 70A2, 70B2, and the like, on the terminal surface 23 side of the battery module 12. Hence it is possible to reduce the dimension of the energy storage apparatus 10 in the Z-direction in which the terminals 21A, 21B protrude.

As another example, the busbar frame 45 may be made of a rigid body in which the connector holder 55 is not rotatable with respect to the frame body 47. Further, the outer case 31 for restraining the plurality of battery cells 14 need not be provided.

In the busbar frame 45, the frame body 47 and the connector holder 55 may be formed as separate parts. In this case, it is preferable that the coupling portion be integrated as a hinge structure in which a shaft portion is provided on one of the frame body 47 and the connector holder 55 and a bearing portion for pivotally supporting the shaft portion is provided on the other.

The locking portion 77 can be changed as necessary so long as being configured to lock the connector holder 55 in the second posture. The locking portion 77 is not necessarily provided.

The binding portion 58, the void 61, and the communication portion 64 can be changed as necessary so long as being configured to prevent the dispersion of the wires 73A, 73B. In particular, the positions where the covers 59, 62, 65 are provided can be changed as necessary. The binding portion 58, the void 61, and the communication portion 64 may not necessarily be provided.

The directions of the connectors 70A, 70B disposed in the connector holder 55 can be changed as necessary. The connectors 70A, 70B may be disposed in opposite directions such that the openings 70a do not face each other, may be disposed such that the openings 70a open in the same direction, or may be disposed side by side in the Z-direction orthogonal to the array direction (X-direction). The number of connectors disposed in the connector holder 55 may be only one or may be three or more. Further, the connectors 70A, 70B may be formed integrally with the connector holder 55.

DESCRIPTION OF REFERENCE SIGNS 10, 10A, 10B . . . energy storage apparatus
12 . . . battery module
14 . . . battery cell (energy storage device)
15 . . . case
16 . . . case body
17 . . . short side-wall
18 . . . long side-wall
19 . . . bottom wall
20 . . . lid
21A, 21B . . . terminal
23 . . . terminal surface
24 . . . bottom
25 . . . long side-surface 26 ... short side-surface
28 ... spacer
29 ... end spacer
31 ... outer case
32 ... end plate
33 ... bracket
34 ... side plate
35 ... holding piece
37 ... lid
40 ... busbar unit
42A to 42C ... busbar
43 ... external terminal
45 ... busbar frame
47 ... frame body
48A to 48C ... attachment portion
49 ... through hole
50 ... first locking protrusion
51 ... second locking protrusion
52 ... holder
53A, 53B ... wiring groove
53a ... regulating protrusion
55, 55A ... connector holder
55a ... substrate
55b ... frame plate
55c ... Locking protrusion
56A, 56B ... attachment portion
57 ... locking piece
58 ... binding portion
59 ... cover
59a ... Locking protrusion
59b ... locking frame
60 ... connection portion
61 ... void
61a ... Inner frame plate
62 ... cover
62a ... locking piece
62b ... locking hole
63 ... connection portion
64 ... communication portion
64a ... Inner frame plate
64b ... Locking protrusion
65 ... cover
65a ... locking piece
65b ... locking hole
66 ... connection portion
68 ... coupling portion
70A, 70B, 70A2, 70B2 ... connector
70a ... opening
71 ... external connector
73A, 73B ... wire
75 ... temperature sensor
77 ... locking portion
78 ... elastic piece

The invention claimed is:

1. An energy storage apparatus comprising:
an energy storage device group in which a plurality of arrayed energy storage devices including terminals form a terminal surface where the terminals are disposed and a side surface intersecting the terminal surface; and
a busbar frame holding a plurality of busbars that connects the terminals adjacent to each other,
wherein
the busbar frame includes:
a body holding the busbars and disposed on the terminal surface;
a connector holder including a connector to which an external connector is connected, the connector holder being disposed on the side surface; and
a coupling portion coupling the body and the connector holder,
wherein the coupling portion couples the connector holder to the body variably between a first posture located along the terminal surface and a second posture located along the side surface,
wherein the connector holder is disposed on the side surface by bending from the first posture to the second posture, and
wherein the energy storage device group further includes an outer case surrounding an outer periphery that includes the side surface and including the terminal surface located at one end, and
the outer case is provided with a locking portion that locks the connector holder in the second posture.

2. The energy storage apparatus according to claim 1, wherein the coupling portion is formed integrally with the body and the connector holder and is bendable with respect to the body and the connector holder.

3. The energy storage apparatus according to claim 1, wherein a binding portion surrounding a plurality of wires connected to the connector is formed at an end portion of the connector holder located on the body side.

4. The energy storage apparatus according to claim 1, wherein in the connector holder, a void in which the wires are installed is formed around the connector.

5. The energy storage apparatus according to claim 1, wherein
the connector holder includes:
a binding portion that is provided at an end portion located on the body side and surrounds a plurality of wires connected to the connector; and
a void that is provided around the connector and in which the wires are installed, and
at least one surface of an outer wall constituting the binding portion or the void is made of an openable and closable cover.

6. The energy storage apparatus according to claim 1, wherein a direction in which the external connector is connected to the connector is located parallel to the side surface.

7. The energy storage apparatus according to claim 1, wherein the connector includes a first connector and a second connector juxtaposed against each other.

* * * * *